United States Patent
Lai et al.

(10) Patent No.: US 11,254,268 B2
(45) Date of Patent: Feb. 22, 2022

(54) ALL-TERRAIN VEHICLE AND WHEEL SPEED SIGNAL COLLECTING DEVICE

(71) Applicant: Zhejiang CFMOTO Power Co., Ltd., Hangzhou (CN)

(72) Inventors: Minjie Lai, Hangzhou (CN); Zhiyong Chen, Hangzhou (CN); Jiajun Li, Hangzhou (CN); Fuying Cheng, Hangzhou (CN); Zhenxiang Kuang, Hangzhou (CN); Yonggang Cui, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 405 days.

(21) Appl. No.: 16/238,318

(22) Filed: Jan. 2, 2019

(65) Prior Publication Data

US 2019/0315292 A1 Oct. 17, 2019

(30) Foreign Application Priority Data

Apr. 16, 2018 (CN) .......................... 201810338964.5

(51) Int. Cl.
*B60R 16/023* (2006.01)
*B60B 35/12* (2006.01)
*B60G 3/14* (2006.01)

(52) U.S. Cl.
CPC ............ *B60R 16/023* (2013.01); *B60B 35/12* (2013.01); *B60G 3/14* (2013.01)

(58) Field of Classification Search
CPC .......... B60R 16/023; B60Y 2400/3032; B60B 35/128; B60B 35/12; B60G 3/14; B60G 3/20; B60K 17/165
See application file for complete search history.

(56) References Cited

U.S. PATENT DOCUMENTS

| | | | | |
|---|---|---|---|---|
| 8,561,749 | B2 * | 10/2013 | Person | B60K 17/16 180/337 |
| 9,751,403 | B2 * | 9/2017 | Steidl | F16H 48/147 |
| 10,723,334 | B2 * | 7/2020 | Pongo | B60K 17/165 |
| 2019/0185080 | A1 * | 6/2019 | Bezeau-Tremblay | B62D 5/0409 |

OTHER PUBLICATIONS

Tundras.com DIY: Rear Differential Breather Mod (https://www.tundras.com/threads/diy-rear-differential-breather-mod.5253/) (Year: 2016).*

* cited by examiner

*Primary Examiner* — Tony H Winner
*Assistant Examiner* — Harold Eric Pahlck, III
(74) *Attorney, Agent, or Firm* — Wolf, Greenfield & Sacks, P.C.

(57) ABSTRACT

An outer ring of an inner joint of the constant speed transmission shaft is provided with a vehicle speed sensor rotating synchronously with the inner joint, and the drive axle is fixedly equipped with a signal collecting device opposite to the vehicle speed sensor and configured to monitor a rotation speed signal of the vehicle speed sensor. The inner joint of the constant speed transmission shaft transmits torque during the running of a vehicle, and through monitoring a rotation speed of the inner joint, the rotation data of rear wheels can be obtained. By mounting the vehicle speed sensor on the inner joint and fixing the signal collecting device on the drive axle for monitoring the rotation speed signal of the vehicle speed sensor, the signal reading is stable, which facilitates the maintenance, reduces the cost, and can satisfy the environmental requirements.

8 Claims, 2 Drawing Sheets

ALL-TERRAIN VEHICLE AND WHEEL SPEED SIGNAL COLLECTING DEVICE

CROSS REFERENCE TO RELATED APPLICATIONS

The present application claims the benefit of priority to Chinese Patent Application No. 201810338964.5 titled "ALL-TERRAIN VEHICLE AND WHEEL SPEED SIGNAL COLLECTING DEVICE", filed with the Chinese State Intellectual Property Office on Apr. 16, 2018, the entire disclosure thereof is incorporated herein by reference.

FIELD

The present application relates to the technical field of all-terrain vehicles, and more specifically relates to an all-terrain vehicle and a wheel speed signal collecting device.

BACKGROUND

ATVs (All-Terrain Vehicle) and UTVs (Utility Vehicle) are mainly used in working situations like sand beach cross-country, cargo carrying in mountainous areas, farm work and so on. Because the ATVs and UTVs can adapt to various cross-country terrains, they are widely used.

Working environments of ATV and UTV models are rather adverse, the ATV and UTV models often travel in such environments for example, mud, gravel, woods, weeds and so on. In order to improve driving safety, the above models are equipped with a vehicle body stabilization system such as an ABS (Antilock Braking System), a four-wheel drive controlling and driving system and so on, and the vehicle body stabilization system is required to monitor a wheel rotation speed signal.

In conventional ATVs and UTVs, in order to monitor the wheel rotation speed signal, a rotation speed monitoring device is arranged at an end of an outer joint of a wheel train. Because of the restriction to the ATV and UTV models from the driving environment, large amounts of mud and other debris around the outer joint are drawn into the outer joint, which causes a malfunction of signal interference, and the signal cables are easily hooked to fall off by foreign matters on the road. Therefore, they are difficult to meet the operating requirements of the adverse working conditions.

Therefore, an issue to be urgently addressed by those skilled in the art is to improve the safety in rotation speed signal monitoring.

SUMMARY

In view of this, a wheel speed signal collecting device is provided according to the present application, to improve the safety in rotation speed signal monitoring; and an all-terrain vehicle is further provided according to the present application.

In order to achieve the above objects, technical solutions are provided as follows according to the present application.

A wheel speed signal collecting device includes a drive axle and a constant speed transmission shaft arranged on the drive axle, an outer ring of an inner joint of the constant speed transmission shaft is provided with a vehicle speed sensor rotating synchronously with the inner joint, and the drive axle is provided with a signal collecting device which is fixedly amounted on the drive axle, and is opposite to the vehicle speed sensor and monitors a rotation speed signal of the vehicle speed sensor.

Preferably, in the wheel speed signal collecting device, the vehicle speed sensor is a gear ring sleeved on the inner joint of the constant speed transmission shaft, and the signal collecting device is an electromagnetic signal collecting device inductively cooperating with the gear ring.

Preferably, in the wheel speed signal collecting device, the electromagnetic signal collecting device includes a mounting bracket mounted on the drive axle and a Hall sensor mounted on the mounting bracket.

Preferably, in the wheel speed signal collecting device, a plurality of signal teeth configured to be in signal induction with the electromagnetic signal collecting device are uniformly distributed on an outer ring of the gear ring around a circumferential direction of the outer ring.

Preferably, in the wheel speed signal collecting device, the drive axle is provided with a cable fixing device for fixing and guiding a signal cable of the Hall sensor.

Preferably, in the wheel speed signal collecting device, the constant speed transmission shaft includes a left constant speed transmission shaft and a right constant speed transmission shaft arranged at two power output ends of the drive axle respectively, and the left constant speed transmission shaft and the right constant speed transmission shaft are both provided with a vehicle speed sensor and a signal collecting device in an inductive cooperation.

An all-terrain vehicle includes a car frame and a drive axle mounted on the car frame, the drive axle is provided with a constant speed transmission shaft for driving a wheel train, and the drive axle is provided with the wheel speed signal collecting device according to any one of the above solutions.

The wheel speed signal collecting device according to the present application includes a drive axle and a constant speed transmission shaft, wherein an outer ring of an inner joint of the constant speed transmission shaft is provided with a vehicle speed sensor rotating synchronously with the inner joint, and the drive axle is provided with a signal collecting device which is fixedly amounted on the drive axle, and is opposite to the vehicle speed sensor and monitors a rotation speed signal of the vehicle speed sensor. The drive axle drives vehicle wheels to motion through the power output of the constant speed transmission shaft. The drive axle is located at a middle portion of a bottom end of a vehicle, and the monitoring of the rotation speed of the vehicle is arranged at a connecting end between the constant speed transmission shaft and the drive axle, the mud and debris drawn by the running of the vehicle have a small effect on a position of the inner joint. The inner joint of the constant speed transmission shaft transmits torque during the running of the vehicle, and through monitoring the rotation speed of the inner joint, the rotation data of rear wheels can be obtained. By mounting the vehicle speed sensor on the inner joint of the constant speed transmission shaft and fixing the signal collecting device on the drive axle for monitoring the rotation speed signal of the vehicle speed sensor, the signal reading is stable, which facilitates the maintenance, reduces the cost, and can satisfy the environmental requirements of the running of an all-terrain vehicle.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION

A wheel speed signal collecting device which improves the safety in rotation signal monitoring, is provided according to the present application. An all-terrain vehicle is further provided according to the present application.

The technical solution of the embodiments according to the present application will be described clearly and completely as follows in conjunction with the drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

Figure 1:
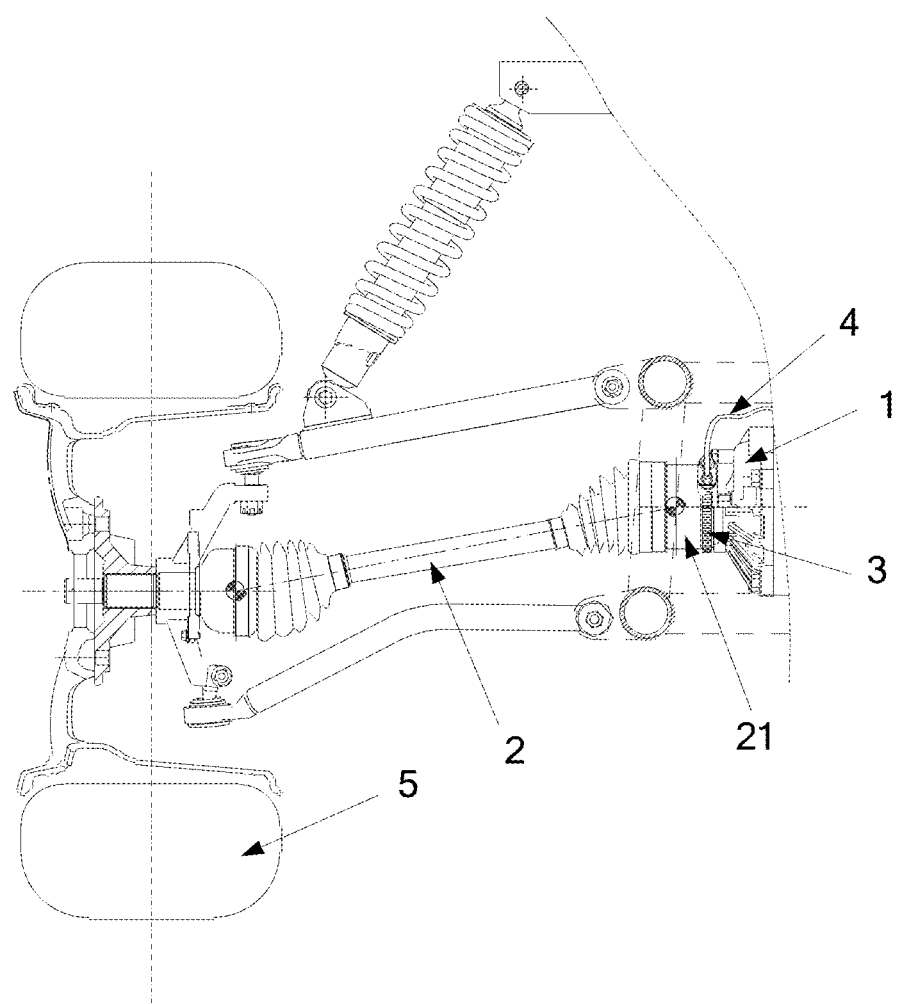
FIG. 1 is a schematic view showing an assembly structure of a wheel speed signal collecting device according to the present application.
Figure 2:
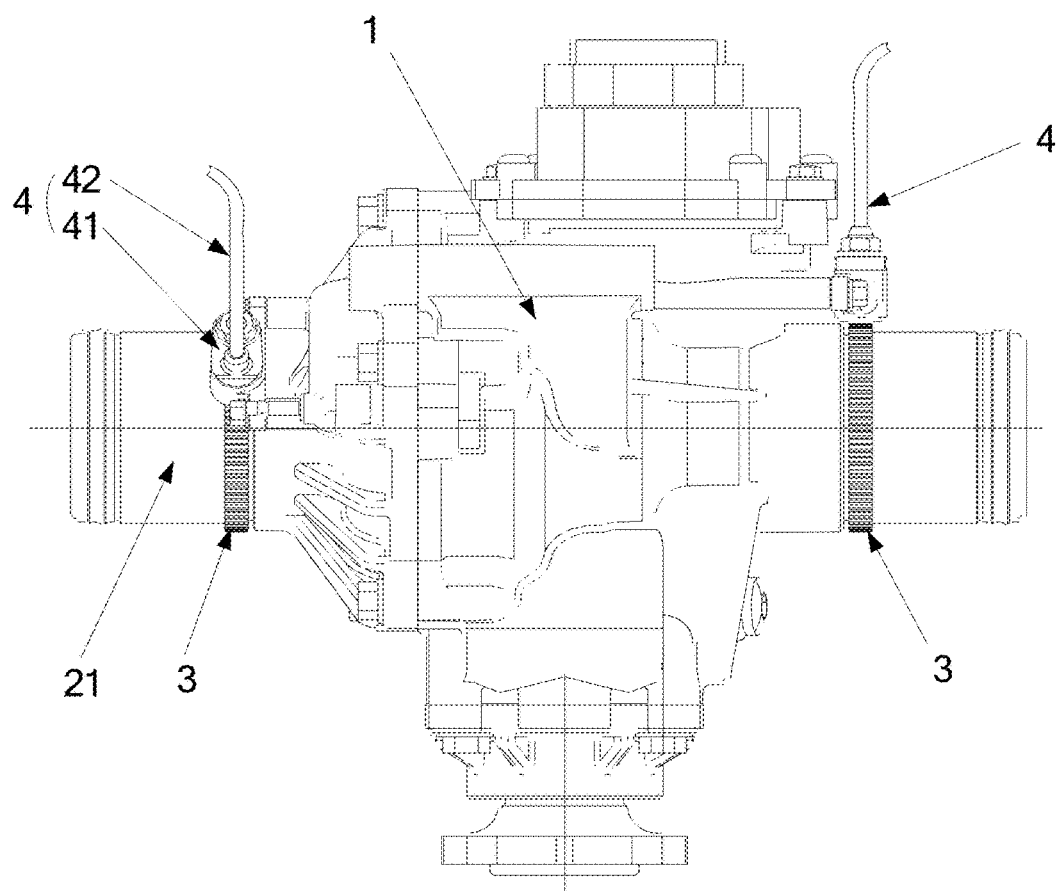
FIG. 2 is a schematic view showing an arrangement structure of the wheel speed signal collecting device according to the present application.
Figure 3:
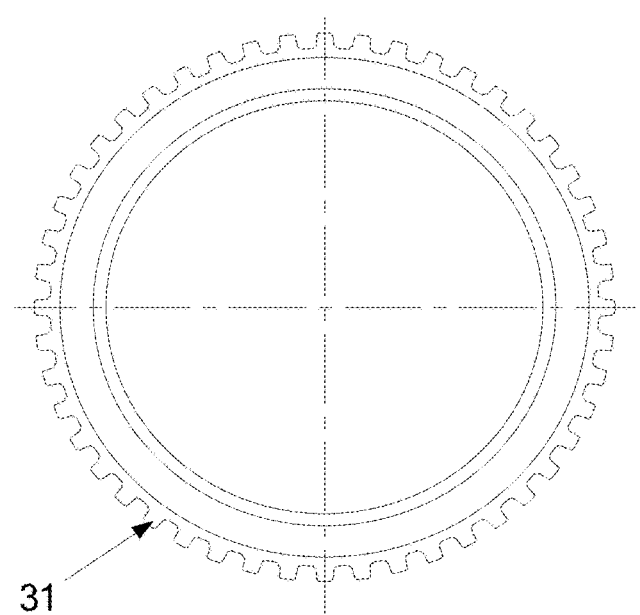
FIG. 3 is a schematic view showing the structure of a gear ring in FIG. 1.

As shown in FIGS. 1 to 3, FIG. 1 is a schematic view showing an assembly structure of a wheel speed signal collecting device according to the present application; FIG. 2 is a schematic view showing an arrangement structure of the wheel speed signal collecting device according to the present application; and FIG. 3 is a schematic view showing the structure of a gear ring in FIG. 1.

A wheel speed signal collecting device is provided according to the present application, including a drive axle 1 and a constant speed transmission shaft 2. An outer ring of an inner joint 21 of the constant speed transmission shaft 2 is provided with a vehicle speed sensor 3 rotating synchronously with the inner joint 21, and the drive axle 1 is provided with a signal collecting device 4 which is fixedly mounted on the drive axle and is opposite to the vehicle speed sensor 3 and monitors a rotation speed signal of the vehicle speed sensor 3. The drive axle 1 outputs power to vehicle wheels 5 by the constant speed transmission shaft 2 to drive the vehicle wheels to move. The drive axle 1 is located at a middle portion of a bottom of a vehicle, and the monitoring of the rotation speed of the vehicle is arranged at a connecting end between the constant speed transmission shaft 2 and the drive axle 1. The mud and debris drawn during the running of the vehicle have a small effect on the drive axle, and the mud and debris are mainly drawn to a position of an outer joint at a position of a wheel gear. The inner joint 21 of the constant speed transmission shaft 2 transmits torque during the running of the vehicle. Since a rotation speed of the outer joint and a rotation speed of the inner joint 21 of the constant speed transmission shaft 2 are equal, the rotation data of the vehicle wheels 5 can be obtained by monitoring the rotation speed of the inner joint 21. By mounting the vehicle speed sensor on the inner joint 21 of the constant speed transmission shaft 2 and fixing the signal collecting device 4 on the drive axle 1 for monitoring the rotation speed signal of the vehicle speed sensor 3, the signal reading is stable, the maintenance is convenient, the cost is reduced, and the environmental requirements of the running of the all-terrain vehicle can be met.

In a specific embodiment according to the present application, the vehicle speed sensor 3 is a gear ring sleeved on the inner joint 21 of the constant speed transmission shaft 2, and the signal collecting device 4 is an electromagnetic signal collecting device which responds to and matches the gear ring. when the drive axle transmits the power, the inner joint 21 of the constant speed transmission shaft 2 rotates and transmits the torque to the outer joint of the constant speed transmission shaft 2, and the constant speed transmission shaft 2 drives the vehicle wheels 5 to rotate. Since the rotation speed of the outer joint and the rotation speed of the inner joint 21 of the constant speed transmission shaft 2 are equal, the rotation data of the vehicle wheels 5 can be obtained by monitoring the rotation speed of the inner joint 21. The inner joint 21 of the constant speed transmission shaft 2 rotates at a high speed during a working process. The vehicle speed sensor 3 may be configured as a signal sensor which is mounted at an outer ring of the inner joint 21 and rotates synchronously with the inner joint 21. The vehicle speed sensor 3 may be on the out ring of the inner joint of the constant speed transmission shaft 2 in the manner of assembling, or the vehicle speed sensor 3 may be on the inner joint in the manner of machining.

In order to reduce the complexity of the structure for monitoring the rotation speed, the vehicle speed sensor 3 is configured as a gear ring structure which is sleeved and amounted on the inner joint 21 of the constant speed transmission shaft 2. The gear ring is sleeved and amounted on the inner joint of the constant speed transmission shaft 2, and the mounting structure is stable and does not affect the uniformity of the rotation speed of the constant speed transmission shaft 2. The signal collecting device 4 is an electromagnetic signal collecting device, and correspondingly, the gear ring is a magnetic induction gear ring. When the gear ring rotates, the gear ring cooperates with the signal collecting device, changes of electromagnetic signals at tooth crests on a surface and tooth roots during the rotation are converted into a rotation speed signal to accurately monitor the rotation speed.

In a specific embodiment according to the present application, the electromagnetic signal collecting device 4 includes a mounting bracket 41 mounted on the drive axle 1 and a Hall sensor 42 mounted on the mounting bracket 41. The gear ring rotates synchronously with the inner joint 21 of the constant speed transmission shaft 2 at a high speed, the electromagnetic signal collecting device 4 is mounted on the drive axle 1, a same position at the inner joint 21 is required to function as a rotation starting point and a rotation finishing point, and an accurate positioning of an induction position of the gear ring and the position at the inner joint is ensured. The mounting bracket 41 extends outwardly in a radial direction of the inner joint 21 and is supported at a certain height. By the cooperation between the Hall sensor 42 and the gear ring, the rotation data of the gear ring are collected, and the changes of the signals are recorded and sent into a control system. By providing the mounting bracket and the Hall sensor, it not only ensures that the signal collecting positions correspond accurately but also ensures the accuracy of the electromagnetic signal collecting.

In a specific embodiment according to the present application, multiple signal teeth 31 configured to be in signal induction with the electromagnetic signal collecting device are uniformly distributed at an outer ring of the gear ring around a circumferential direction thereof. The outer ring of the gear ring is distributed with the signal teeth 31. When the inner joint 21 rotates, the electromagnetic signal collecting device scans the signal teeth 31 at the outer ring of the gear ring, and changes of the intensity of electromagnetic signals between the signal teeth 31 are converted to a vehicle speed signal and are outputted. In order to ensure the accuracy in signal collecting, the signal teeth are arranged to be multiple signal teeth uniformly distributed around the outer ring of the gear ring. The number of the signal teeth should be moderate. If the signal teeth were too many, they would have a high density and if the signal teeth were too few, they would signal teeth have a low density, which both will affect the accuracy of the rotation speed signal monitoring. The number of the signal teeth is preferably 45 to 53.

In a specific embodiment according to the present application, the drive axle 1 is provided with a cable fixing device for fixing and guiding a signal cable of the Hall sensor. An inductive end of the electromagnetic signal collecting device is opposite to the gear ring, and a cable of the electromagnetic signal collecting device is away from the inner joint. For the safety of cabling, after the Hall sensor is fixed on the mounting bracket, the signal cable is introduced into an interior of a vehicle body by a fixing device and a guiding device on the a gearbox of the drive axle so as to be connected to the control system. According to the layout of a chassis of the all-terrain vehicle, a unified cable route may also be arranged to improve the stability and safety of cable installation.

In a specific embodiment according to the present application, the constant speed transmission shaft includes a left constant speed transmission shaft and a right constant speed transmission shaft which are arranged at two power output ends of the drive axle respectively, and the left constant speed transmission shaft and the right constant speed transmission shaft are both provided with a vehicle speed sensor and a signal collecting device, which are in an inductive cooperation. Specifically, a first gear ring is sleeved on the left constant speed transmission shaft, a first mounting bracket is mounted on the drive axle, and first rotation speed data of a left wheel is collected by a first Hall sensor; and a second gear ring is sleeved on the right constant speed transmission shaft, a second mounting bracket is mounted at a right side of the drive axle, and second rotation speed data of a right wheel is collected by a second Hall sensor.

Similarly, regarding a four-wheel drive vehicle such as an ATV/UTV or the like, four constant speed transmission shafts are provided to drive front wheels and rear wheels respectively and four rotation speed signals are required to be collected. Therefore, the cables collect the rotation speed data which include first rotation speed data, second rotation speed data, third rotation speed data and fourth rotation speed data of four wheels. By inputting the rotation speed data of each of the wheels into the vehicle control system, the vehicle control system can obtain stable rotation speed signals of the wheels which are used in stabilization systems such as an ABS and the like. Since the inner joint is used to monitor the rotation speed signals of the wheels, the obtained rotation speed data are equal to actual rotation speeds of the wheels, the influence from the external environment is little and the signals are stable.

Based on the wheel speed signal collecting device according to the above embodiments, an all-terrain vehicle is provided according to the present application, including a car frame and a drive axle mounted on the car frame. The drive axle is provided with a constant speed transmission shaft for driving a wheel train. The all-terrain vehicle is provided with the wheel speed signal collecting device according to any one of the above solutions.

Since the all-terrain vehicle uses the wheel speed signal collecting device according to the above embodiments, the beneficial effects of the all-terrain vehicle brought by the wheel speed signal collecting device can refer to the above embodiments.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A wheel speed signal collecting device, comprising a drive axle and a constant speed transmission shaft arranged on the drive axle;
   wherein an outer ring of an inner joint of the constant speed transmission shaft is provided with a vehicle speed sensor rotating synchronously with the inner joint, and the drive axle is provided with a signal collecting device which is fixedly amounted on the drive axle and is opposite to the vehicle speed sensor, and is configured to monitor a rotation speed signal of the vehicle speed sensor;
   wherein the vehicle speed sensor is a gear ring sleeved on the inner joint of the constant speed transmission shaft, and the signal collecting device is an electromagnetic signal collecting device inductively cooperating with the gear ring; and
   wherein a plurality of signal teeth in signal induction with the electromagnetic signal collecting device are uniformly distributed on an outer ring of the gear ring around a circumferential direction of the outer ring, and the number of the signal teeth ranges from 45 to 53.

2. The wheel speed signal collecting device according to claim 1, wherein the electromagnetic signal collecting device comprises a mounting bracket mounted on the drive axle and a Hall sensor mounted on the mounting bracket.

3. The wheel speed signal collecting device according to claim 2, wherein the constant speed transmission shaft comprises a left constant speed transmission shaft and a right constant speed transmission shaft arranged at two power output ends of the drive axle respectively, and the left constant speed transmission shaft and the right constant speed transmission shaft are both provided with a vehicle speed sensor and a signal collecting device in an inductive cooperation.

4. An all-terrain vehicle, comprising a car frame and a drive axle mounted on the car frame, wherein the drive axle is provided with a constant speed transmission shaft for driving a wheel train, and the drive axle is provided with the wheel speed signal collecting device according to claim 3.

5. An all-terrain vehicle, comprising a car frame and a drive axle mounted on the car frame, wherein the drive axle is provided with a constant speed transmission shaft for driving a wheel train, and the drive axle is provided with the wheel speed signal collecting device according to claim 2.

6. The wheel speed signal collecting device according to claim 1, wherein the constant speed transmission shaft comprises a left constant speed transmission shaft and a right constant speed transmission shaft arranged at two power output ends of the drive axle respectively, and the left constant speed transmission shaft and the right constant speed transmission shaft are both provided with a vehicle speed sensor and a signal collecting device in an inductive cooperation.

7. An all-terrain vehicle, comprising a car frame and a drive axle mounted on the car frame, wherein the drive axle is provided with a constant speed transmission shaft for driving a wheel train, and the drive axle is provided with the wheel speed signal collecting device according to claim 6.

8. An all-terrain vehicle, comprising a car frame and a drive axle mounted on the car frame, wherein the drive axle is provided with a constant speed transmission shaft for driving a wheel train, and the drive axle is provided with the wheel speed signal collecting device according to claim 1.

* * * * *